US010765585B2

(12) United States Patent
Maekawa

(10) Patent No.: US 10,765,585 B2
(45) Date of Patent: Sep. 8, 2020

(54) WALKING ASSISTANCE ROBOT FOR ASSISTING SMOOTH START OF USER'S ACTION AFTER STANDING UP FROM CHAIR

(71) Applicant: Panasonic Intellectual Property Management Co., Ltd., Osaka (JP)

(72) Inventor: Hidetsugu Maekawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 800 days.

(21) Appl. No.: 15/417,278

(22) Filed: Jan. 27, 2017

(65) Prior Publication Data

US 2017/0258665 A1 Sep. 14, 2017

(30) Foreign Application Priority Data

Mar. 9, 2016 (JP) ................. 2016-046166

(51) Int. Cl.
*A61H 3/00* (2006.01)
*A61H 3/04* (2006.01)
(Continued)

(52) U.S. Cl.
CPC ............... *A61H 3/04* (2013.01); *A61G 5/14* (2013.01); *B62B 5/00* (2013.01);
(Continued)

(58) Field of Classification Search
USPC .............................................. 700/245–264
See application file for complete search history.

(56) References Cited

U.S. PATENT DOCUMENTS 4,809,804 A * 3/1989 Houston .............. A61G 5/1051
180/65.51
5,137,102 A * 8/1992 Houston, Sr. .......... A61G 5/042
180/65.51
(Continued)

FOREIGN PATENT DOCUMENTS

CN          1972732 A     5/2007
JP       2005-080856 A    3/2005
(Continued)

OTHER PUBLICATIONS

English Translation of Chinese Search Report dated May 19, 2020 for the related Chinese Patent Application No. 201710014970.0.

*Primary Examiner* — Jonathan L Sample
(74) *Attorney, Agent, or Firm* — Greenblum & Bernstein, P.L.C.

(57) ABSTRACT

A system is disclosed which includes a walking assistance robot for assisting a smooth start of a user's action after standing up from a chair. A system according to an aspect of the present disclosure includes a walking assistance robot and an automatic elevation chair that moves a seating surface where a user sits. The automatic elevation chair detects a consciousness level of the user and transmits consciousness level information on the detected consciousness level of the user to the walking assistance robot via the network. The walking assistance robot, including a body and a rotor that moves the walking assistance robot, receives the consciousness level information via the network and controls resistance force to rotation of the rotor based on the received consciousness level information.

7 Claims, 11 Drawing Sheets

(51) Int. Cl.
    *A61G 5/14* (2006.01)
    *B62B 5/00* (2006.01)
(52) U.S. Cl.
    CPC .. *A61H 2003/043* (2013.01); *A61H 2003/046* (2013.01); *A61H 2201/1207* (2013.01); *A61H 2201/501* (2013.01); *A61H 2201/5061* (2013.01); *A61H 2201/5097* (2013.01); *A61H 2230/045* (2013.01); *A61H 2230/06* (2013.01); *A61H 2230/105* (2013.01); *Y10S 901/01* (2013.01)

(56) References Cited

U.S. PATENT DOCUMENTS

| 5,411,044 | A  | * | 5/1995  | Andolfi   | A61G 7/1017  |
|           |    |   |         |           | 135/66       |
| 8,679,040 | B2 | * | 3/2014  | Horst     | A61H 1/0237  |
|           |    |   |         |           | 601/34       |
| 9,586,318 | B2 | * | 3/2017  | Djugash   | B25J 9/1694  |
| 2006/0149338 | A1 |   | 7/2006 | Flaherty | A61H 1/0277 |
|           |    |   |         |           | 607/49       |
| 2006/0163829 | A1 | * | 7/2006 | Livengood | A61B 50/13  |
|           |    |   |         |           | 280/87.021   |
| 2007/0192910 | A1 | * | 8/2007 | Vu       | G05D 1/021   |
|           |    |   |         |           | 700/245      |
| 2008/0072942 | A1 | * | 3/2008 | Warren   | A61H 3/04    |
|           |    |   |         |           | 135/67       |
| 2008/0242521 | A1 |   | 10/2008 | Einav   |              |
| 2010/0270771 | A1 | * | 10/2010 | Kobayashi | A61H 1/0255 |
|           |    |   |         |           | 280/210      |
| 2012/0023661 | A1 |   | 2/2012 | Ota et al. |             |
| 2012/0187661 | A1 | * | 7/2012 | Kim      | A61H 3/04    |
|           |    |   |         |           | 280/650      |
| 2013/0306120 | A1 | * | 11/2013 | Fukunaga | A61G 5/024  |
|           |    |   |         |           | 135/66       |
| 2014/0196757 | A1 | * | 7/2014 | Goffer   | A61H 1/0262  |
|           |    |   |         |           | 135/66       |
| 2015/0359699 | A1 | * | 12/2015 | Chang   | A61G 5/1094  |
|           |    |   |         |           | 701/22       |
| 2016/0008206 | A1 | * | 1/2016 | Devanaboyina | A61H 1/001 |
|           |    |   |         |           | 601/136      |
| 2016/0058649 | A1 | * | 3/2016 | Fu       | A63B 24/0062 |
|           |    |   |         |           | 482/3        |
| 2016/0128890 | A1 | * | 5/2016 | LaChappelle | A61F 2/60 |
|           |    |   |         |           | 623/30       |
| 2016/0346156 | A1 | * | 12/2016 | Walsh   | A63B 21/152  |
| 2017/0027801 | A1 | * | 2/2017 | Choi     | A61F 5/0102  |
| 2017/0224573 | A1 | * | 8/2017 | Challa   | A45B 3/00    |
| 2017/0352288 | A1 | * | 12/2017 | Weffers-Albu | G16H 20/30 |

FOREIGN PATENT DOCUMENTS

| JP | 2006-158733 | A  | 6/2006  |
| JP | 2006-247055 | A  | 9/2006  |
| JP | 2011-010874 |    | 1/2011  |
| JP | 2012-030077 | A  | 2/2012  |
| JP | 2012-200409 |    | 10/2012 |
| JP | 2013-056041 | A  | 3/2013  |
| WO | 2007/086222 | A1 | 8/2007  |

* cited by examiner

RIGHT ←→ LEFT

WALKING ASSISTANCE ROBOT FOR ASSISTING SMOOTH START OF USER'S ACTION AFTER STANDING UP FROM CHAIR

BACKGROUND

1. Technical Field

The present disclosure relates to a system, a walking assistance robot, and a method for assisting a smooth start of a user's action after standing up from a chair.

2. Description of the Related Art

As the birthrates have been declining and the population has been aging in developed countries in late years, the need for watching elderly people and assisting their lives has been increasing. In particular, as a tendency, it is difficult for elderly people to keep QOL (Quality of Life) in living at home because of a decline in their physical performance that occurs with aging. In order to prevent sarcopenia and similar conditions in elderly people and keep their physical performances, it is important for them to keep on exercising at a certain level or more to keep their muscle masses. However, for the elderly people who tend to spend their time at home because the decline in their physical performance prevents them from going out, it is difficult to keep a necessary amount of exercise, resulting in more decrease in their muscle masses, and this becomes vicious cycles.

In late years, in the background described above, there have been proposed various apparatuses which assist a standing-up action from a chair, which is a starting point of living activities.

For example, as for standing-up action assistance robot disclosed in Japanese Unexamined Patent Application Publication No. 2012-200409, a supporting portion of the robot follows the movement of the user's chest to assist a standing-up action of the user sitting on a chair.

Meanwhile, for example, a dental chair disclosed in Japanese Unexamined Patent Application Publication No. 2011-10874 assists the patient's standing-up action by raising obliquely upward the pad portions that support the patient's elbows in synchronization with a rise of the seat.

SUMMARY

In the apparatuses in Japanese Unexamined Patent Application Publication No. 2012-200409 and Japanese Unexamined Patent Application Publication No. 2011-10874, functions of only the robot or only the chair assist the standing-up action. In view of assisting a smooth start of the user's action after standing up from a chair, there is still room for improvement in these apparatuses.

One non-limiting and exemplary embodiment provides a system, a walking assistance robot and a method capable of assisting a smooth start of the user's action after standing up from a chair.

In one general aspect, the techniques disclosed here feature a life assistance system including: a walking assistance robot; and an automatic elevation chair that moves a seating surface where a user sits, the automatic elevation chair being connected to the walking assistance robot via a network, in which the automatic elevation chair includes: a first processor; and a first memory storing thereon a first computer program, which when executed by the first processor, causes the first processor to perform first operations including: detecting a consciousness level of the user; transmitting consciousness level information on the detected consciousness level of the user to the walking assistance robot via the network, and the walking assistance robot includes: a body; a rotor that moves the walking assistance robot; a second processor; and a second memory storing thereon a second computer program, which when executed by the second processor, causes the second processor to perform second operations including: receiving the consciousness level information via the network; and controlling resistance force to rotation of the rotor based on the received consciousness level information.

As described above, according to the life assistance system of the present disclosure, it is possible to assist a smooth start of a user's action after standing up from a chair.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
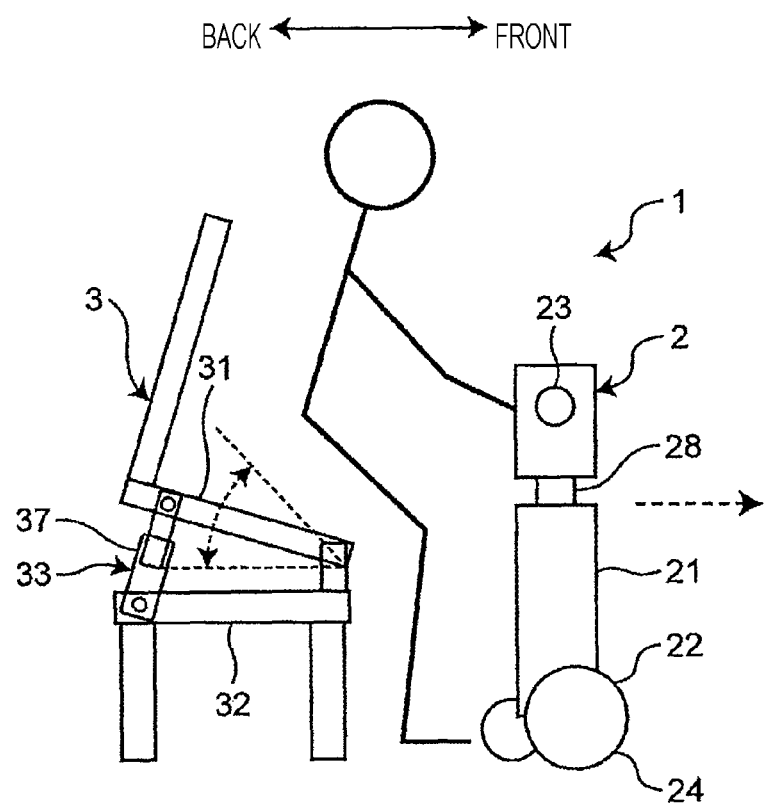
FIG. 1 is a schematic diagram of a life assistance system according to a first embodiment of the present disclosure.

DETAILED DESCRIPTION (Underlying Knowledge Forming Basis of Present Disclosure)

In late years, life assistance systems have been developed which include a walking assistance robot for assisting a user in walking and an automatic elevation chair in which a seating surface where the user sits moves, both connected to each other via a network. These life assistance systems perform a standing-up assistance as well as the walking assistance using the walking assistance robot and the automatic elevation chair.

However, there is a problem that in the case where the consciousness level of a user sitting on the chair is low, the user cannot start a stable action after the user stands up with the standing-up assistance. For example, in the case where the user has just woken up, if the walking assistance robot starts a walking assistance after the user stands up with the standing-up assistance, the user is unsteady on his/her feet and sometimes falls down.

The inventors found out that it is possible to assist a stable start of the user's action after standing up by controlling resistance force to the rotation of the rotors that are a moving mechanism of the walking assistance robot, depending on the consciousness level of the user. This led the inventors to the following disclosure.

A life assistance system according to an aspect of the present disclosure, including:

a walking assistance robot; and an automatic elevation chair that moves a seating surface where a user sits, the automatic elevation chair being connected to the walking assistance robot via a network, in which the automatic elevation chair includes:

a first processor; and a first memory storing thereon a first computer program, which when executed by the first processor, causes the first processor to perform first operations including:
detecting a consciousness level of the user;
transmitting consciousness level information on the detected consciousness level of the user to the walking assistance robot via the network, and the walking assistance robot includes:

a body;

a rotor that moves the walking assistance robot;

a second processor; and a second memory storing thereon a second computer program, which when executed by the second processor, causes the second processor to perform second operations including:
receiving the consciousness level information via the network; and
controlling resistance force to rotation of the rotor based on the received consciousness level information.

The configuration above makes it possible to control actions of the walking assistance robot based on the consciousness level of the user. As a result, after the user stands up with the help of the movement of the seating surface of the automatic elevation chair, it is possible to assist a smooth start of the user's walking action using the walking assistance robot.

In the life assistance system described above, the second operations may increase the resistance force as the consciousness level of the user is lower.

The configuration above allows the movement of the walking assistance robot to be regulated when the consciousness level of the user is low. As a result, it possible to reduce the risk of the user staggering and falling down after standing up and the like, and further assist a smooth start of the user's walking action.

In the life assistance system described above, the first operations may include:
detecting heart beats of the user; and
calculating the consciousness level of the user based on an LF component and an HF component in variability of the detected heart beats.

The configuration above makes it possible to detect the consciousness level of the user more easily based on the user's heart beats.

In the life assistance system described above, the first operations may include:
detecting a brain wave of the user; and
calculating the consciousness level of the user based on the detected brain wave.

The configuration above makes it possible to detect the consciousness level of the user more accurately based on the user's brain wave.

In the life assistance system described above, the walking assistance robot may further include:
a handle that is provided to the body and that the user is able to hold; and
a sensor that detects a handle load imposed on the handle, and
the second operations may include
terminating the controlling resistance force based on the handle load detected by the sensor.

The configuration above makes it possible to terminate the control of the resistance force to the rotation of the rotor based on the handle load imposed on the handle of the walking assistance robot, and start the walking assistance by the walking assistance robot smoothly.

In the life assistance system described above, the first operations may include
controlling the movement of the seating surface responding to an action of the sitting user standing up based on the handle load detected by the sensor of the walking assistance robot.

The configuration above allows the user to start walking smoothly from the state where the user is sitting.

A walking assistance robot according to an aspect of the present disclosure includes:

a body;

a rotor that moves the walking assistance robot;

a processor, and a memory storing thereon a computer program, which when executed by the processor, causes the processor to perform operations including:
receiving consciousness level information on a consciousness level of a user via a network; and
controlling resistance force to rotation of the rotor based on the received consciousness level information.

The configuration above makes it possible to control the actions of the walking assistance robot based on the consciousness level of the user. As a result, it is possible to assist a smooth start of the user's walking action using the walking assistance robot.

In the walking assistance robot, the operations may include increasing the resistance force as the consciousness level of the user is lower.

The configuration above makes it possible to regulate the movement of the walking assistance robot when the consciousness level of the user is low. As a result, it is possible to assist a start of the user's walking action more smoothly.

The walking assistance robot may further include:
a handle that is provided to the body and that the user is able to hold, and
a sensor that detects a handle load imposed on the handle, in which
the operations may include terminating the controlling resistance force based on the handle load detected by the sensor.

The configuration above makes it possible to terminate the control of the resistance force to the rotation of the rotor based on the handle load imposed on the handle of the walking assistance robot, and start the walking assistance by the walking assistance robot smoothly.

A life assistance method according to an aspect of the present disclosure includes:
detecting a consciousness level of a user;
transmitting consciousness level information on the consciousness level of the user to a walking assistance robot via a network; and
controlling resistance force to rotation of a rotor of the walking assistance robot based on the consciousness level information.

The configuration above makes it possible to control actions of the walking assistance robot based on the consciousness level of the user. As a result, it is possible to assist a smooth start of the user's walking action using the walking assistance robot.

In the life assistance method, the controlling resistance force to the rotor may include increasing the resistance force as the consciousness level of the user is lower.

The configuration above makes it possible to regulate the movement of the walking assistance robot when the consciousness level of the user is low. As a result, it is possible to assist a start of the user's walking action more smoothly.

In the life assistance method described above,
the detecting the consciousness level of the user may include:
detecting heart beats of the user; and
calculating the consciousness level of the user based on an LF component and an HF component in variability of the detected heart beats.

The configuration above makes it possible to detect the consciousness level of the user more easily based on the user's heart beats.

In the life assistance method described above,
the detecting the consciousness level of the user may include:
detecting a brain wave of the user, and
calculating the consciousness level of the user based on the detected brain wave.

The configuration above makes it possible to detect the consciousness level of the user more accurately based on the user's brain wave.

In the life assistance method described above, the controlling resistance force to the rotor may include terminating the controlling resistance force based on a handle load imposed on a handle of the walking assistance robot.

The configuration above makes it possible to terminate the control of the resistance force to the rotation of the rotor based on the handle load imposed on the handle of the walking assistance robot, and start the walking assistance by the walking assistance robot smoothly.

Hereinafter, an embodiment of the present disclosure will be described referring to the accompanying drawings. In the drawings, the illustration of each element is exaggerated to make the explanation easier.

First Embodiment

[Overall Structure]

Figure 2:
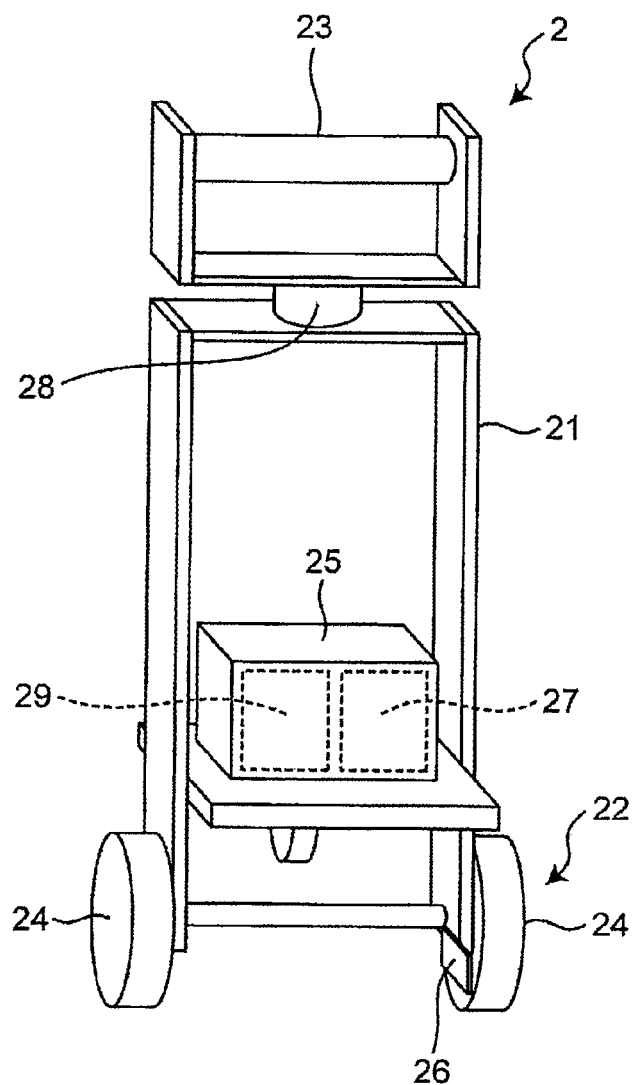
FIG. 2 is an external view of a robot according to the first embodiment of the present disclosure.
Figure 3:
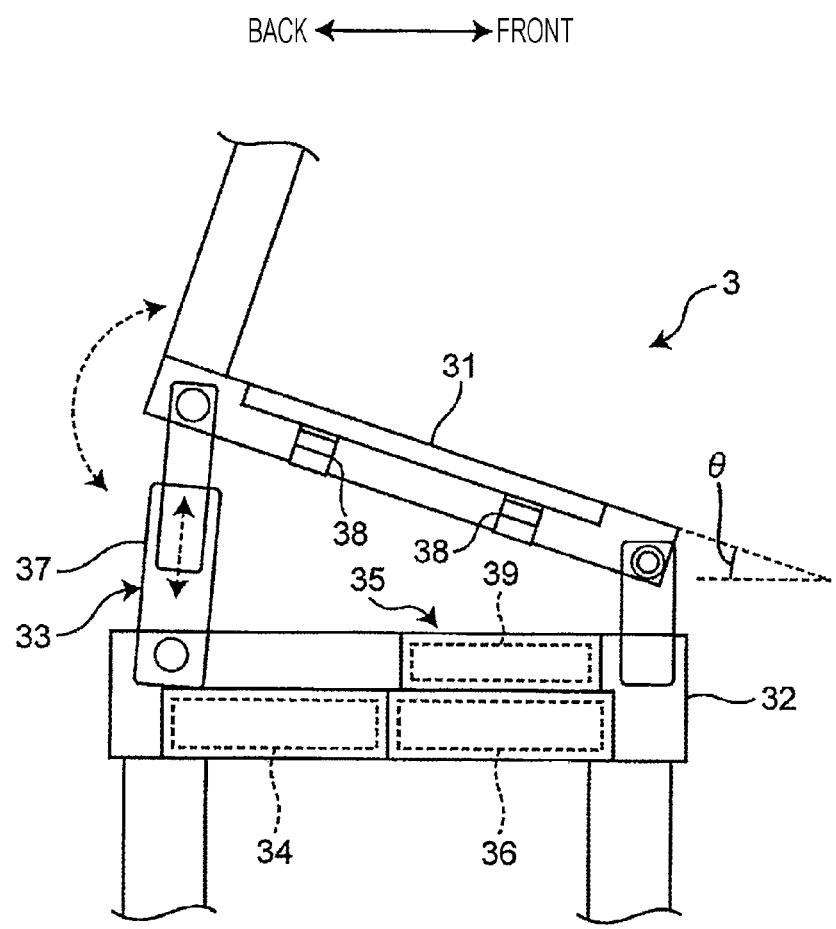
FIG. 3 is an external view of a chair according to the first embodiment of the present disclosure.

FIG. 1 illustrates the structure of a life assistance system 1 according to a first embodiment. As illustrated in FIG. 1, the life assistance system 1 includes a robot 2 as a walking assistance robot and a chair 3 as a standing-up assistance chair. The robot 2 used in the first embodiment is, for example, an autonomous mobile robot that moves by a user's pushing force. The chair 3 used in the first embodiment is an automatic elevation chair. In the first embodiment, for example, the robot 2 and the chair 3 connected to each other via a communication network constitute the life assistance system 1. An external view of the robot 2 is illustrated in FIG. 2, and an external view of the chair 3 is illustrated in FIG. 3. In the example illustrated in FIG. 1, the robot 2 and the chair 3 are placed on a floor surface.

(Structure of Walking Assistance Robot)

As illustrated in FIGS. 1 and 2, the robot 2 corresponding to the walking assistance robot includes a body 21, a moving apparatus 22 which moves the body 21 in a self-standing condition, and a handle 23 which is provided to the body 21 and which the user can hold.

The moving apparatus 22 includes multiple wheels 24 provided under the body 21, a driver 25 which moves the body 21 by rotationally driving the wheels 24, a brake 26 which brakes the wheels 24, and a resistance controller 27 which controls resistance force to the rotation of the wheels 24.

The wheels 24 support the body 21 in the self-standing condition and are rotationally driven by the driver 25 such as a motor to move the body 21 in the direction indicated by the arrow in FIG. 1 (forward or backward) with the body 21 kept in the self-standing orientation. Note that the first embodiment illustrates an example where the moving apparatus 22 includes a moving mechanism using the wheels 24. However, rotors other than wheels (travelling belts, rollers, or the like) may be used.

The brake 26 includes a braking mechanism to stop rotation of the wheels 24, or reduce the speed of the rotation by applying resistance to the wheels 24. The breaking mechanism may be, for example, a mechanism including a brake that clamps the wheels 24 or a mechanism including a regenerative brake utilizing the driver 25.

The resistance controller 27 controls resistance force to the rotation of the wheels 24 based on the consciousness level of the user. In the first embodiment, the resistance controller 27 controls the resistance force applied to the wheels 24 by controlling the brake 26. In this specification, the consciousness level indicates the degree of consciousness of the user. A low consciousness level indicates a state where the user has just woken up (is still sleepy). A high consciousness level indicates a state where the user is conscious (a state of being fully conscious). In the first embodiment, as the consciousness level of the user is lower, the resistance controller 27 increases the resistance force to the rotation of the wheels 24.

The resistance controller 27, for example, includes a processing circuit (not illustrated) corresponding to a processor such as central processing unit (CPU) and a memory (not illustrated) that stores a program to cause the processing circuit to function as the resistance controller 27. The processor executes the program to function as the resistance controller 27.

Alternatively, the resistance controller 27 may be configured by using an integrated circuit that is caused to function as the resistance controller 27.

The handle 23 is provided at an upper portion of the body 21 at a height and in a shape that make it easy for the user to hold with both his/her hands in a state where the user is sitting as well as a state where the user is standing.

In addition, the robot 2 includes a handle load detector 28 which detects a handle load imposed on the handle 23. The handle load detector 28 detects the load imposed on the handle 23 by the user when the user holds the handle 23.

For example, when the user sitting on the chair 3 stands up holding the handle 23, the user imposes a load (handle load) on the handle 23. The handle load detector 28 detects the direction and the amplitude of the handle load imposed on the handle 23 by the user.

Alternatively, the handle load detector 28 may, for example, divide the handle load imposed on the handle 23 by the user into a vertical direction and a horizontal direction relative to the floor surface, and detect a handle load imposed in each of the vertical direction and the horizontal direction.

A force sensor may be used for such a handle load detector 28, for example. The handle load detected by the handle load detector 28 is inputted to the resistance controller 27 and used to control the resistance force to the rotation of the wheels 24. In the first embodiment, the resistance controller 27 terminates the control of the resistance force to the rotation of the wheels 24 based on the handle load detected by the handle load detector 28.

Furthermore, the robot 2 is provided with a communication unit 29 which receives information transmitted from the chair 3 via the communication network.

(Structure of Automatic Elevation Chair)

As illustrated in FIGS. 1 and 3, the chair 3 corresponding to the automatic elevation chair includes a seating surface 31 where the user sits, a frame 32, a seating surface moving apparatus 33, a seating surface controlling apparatus 34, a consciousness level detecting apparatus 35, and a communication unit 36.

Note that in this specification, the forward direction means the direction on the front side of the user when the user is sitting on the chair 3 or the direction toward the front of the chair 3 (the direction to the front), and the backward direction means the direction on the back side of the user or the direction toward the back of the chair 3 (the direction to the back).

The right-left direction means the right-left direction of the chair 3 or the right-left direction with respect to the front side of the user. For example, the right-left direction in FIG. 1 is the direction orthogonal to the paper surface.

The seating surface 31 is supported by the frame 32. Specifically, a front end portion of the seating surface 31 is supported by the frame 32 so as to be rotatable on a rotation shaft (not illustrated). A back end portion of the seating surface 31 is supported by the frame 32, for example, via a hydraulic elevation actuator 37 as a mechanism that mechanically expands and contracts in the up-down direction. The expansion and contraction of the elevation actuator 37 caused by hydraulic pressures move the seating surface 31. Specifically, for example, when the elevation actuator 37 expands in FIG. 1, the seating surface 31 pivots clockwise on a rotation axis. In FIG. 1, when the expanded elevation actuator 37 contracts, the seating surface 31 pivots counter-clockwise on the rotation axis. As described above, the expansion and contraction of the elevation actuator 37 move the seating surface 31 so as to change the angle $\theta$ of the seating surface 31 with respect to the floor surface (or the frame 32) (in other words, so as to incline the seating surface 31 at the angle $\theta$ with respect to the floor surface).

The seating surface moving apparatus 33 moves the seating surface 31 such that the seating surface 31 is inclined in the forward direction. In the first embodiment, the seating surface moving apparatus 33 includes the elevation actuator 37, and the expansion and contraction of the elevation actuator 37 move the seating surface 31 such that the seating surface 31 is inclined in the forward direction. Note that the angle $\theta$ of the seating surface 31 to the floor surface in this specification represents the angle with respect to the orientation of the seating surface when the user sits (for example, substantially horizontal orientation).

The state where the orientation of the seating surface is substantially horizontal is, in other words, the state where the seating surface 31 and the floor surface are in parallel with each other or presumed to be in parallel. In this state, the frame 32 and the floor surface are in parallel with each other or presumed to be substantially in parallel. Therefore, in the case the seating surface 31 is in the orientation when the user is seated, the angle formed by the seating surface 31 and the frame is 0 degrees or a value that may be regarded as 0 degrees.

Note that for the movement of the seating surface 31, other than the hydraulic elevation actuator 37, an electric motor may be used, for example, as an elevation actuator 37, or other various driving apparatuses may be used for the elevation actuator 37.

The seating surface controlling apparatus 34 controls the movement of the seating surface 31 caused by the seating surface moving apparatus 33. Specifically, the seating surface controlling apparatus 34 controls the movement of the seating surface 31 caused by the seating surface moving apparatus 33 (in other words, the elevation actuator 37) based on assistance control information. The assistance control information includes information about movement speed of the seating surface 31. The information about the movement speed of the seating surface 31 includes, for example, information about a seating surface load detected by a seating surface load detector (not illustrated) disposed inside the seating surface 31, or the like.

The seating surface controlling apparatus 34 calculates a control value corresponding to the movement speed included in the assistance control information and outputs the calculated control value to the seating surface moving apparatus 33.

When receiving the control value, the seating surface moving apparatus 33 moves the seating surface 31 at a moving speed corresponding to the control value. With this process, the seating surface 31 moves (inclines) at the moving speed included in the assistance control information.

The moving speed of the seating surface 31 represents, for example, the amount of movement of the seating surface 31 per unit time. In the first embodiment, the seating surface 31 pivots on the rotation axis. Hence, the moving speed of the seating surface 31 represents the amount of inclination of the seating surface 31 caused by the seating surface moving apparatus 33 in a unit of time, in other words, the inclination speed of the seating surface 31.

The amount of inclination of the seating surface 31 caused by the seating surface moving apparatus 33 in a unit of time is also referred to as the change amount of the angle $\theta$ per unit time of the seating surface 31, the angular speed of the seating surface 31, the rotation speed of the seating surface 31, or the speed of the seating surface angle θ.

The consciousness level detecting apparatus 35 detects the consciousness level of the user. In the first embodiment, the consciousness level of the user is calculated based on the variability of RR intervals of the user's heart beats to create consciousness level information on the consciousness level of the user. The consciousness level detecting apparatus 35 includes a heart beat detector 38 which detects user's heart beats and a consciousness level calculator 39 which calculates the consciousness level of the user based on the heart beats detected by the heart beat detector 38. In the first embodiment, in addition to the heart beat sensor, for example, a pressure sensor and/or a load sensor may be used as the heart beat detector 38. To be capable of detecting heart beats regardless of the position that the user sit at on the seating surface 31, multiple heart beat detectors 38 may be provided to the seating surface 31.

The communication unit 36, for example, transmits via the communication network the consciousness level information created by the consciousness level detecting apparatus 35. For example, the communication unit 36 transmits the consciousness level information created by the consciousness level detecting apparatus 35, to the communication unit 29 of the robot 2.

(Control Configuration of Life Assistance System)

Figure 4:
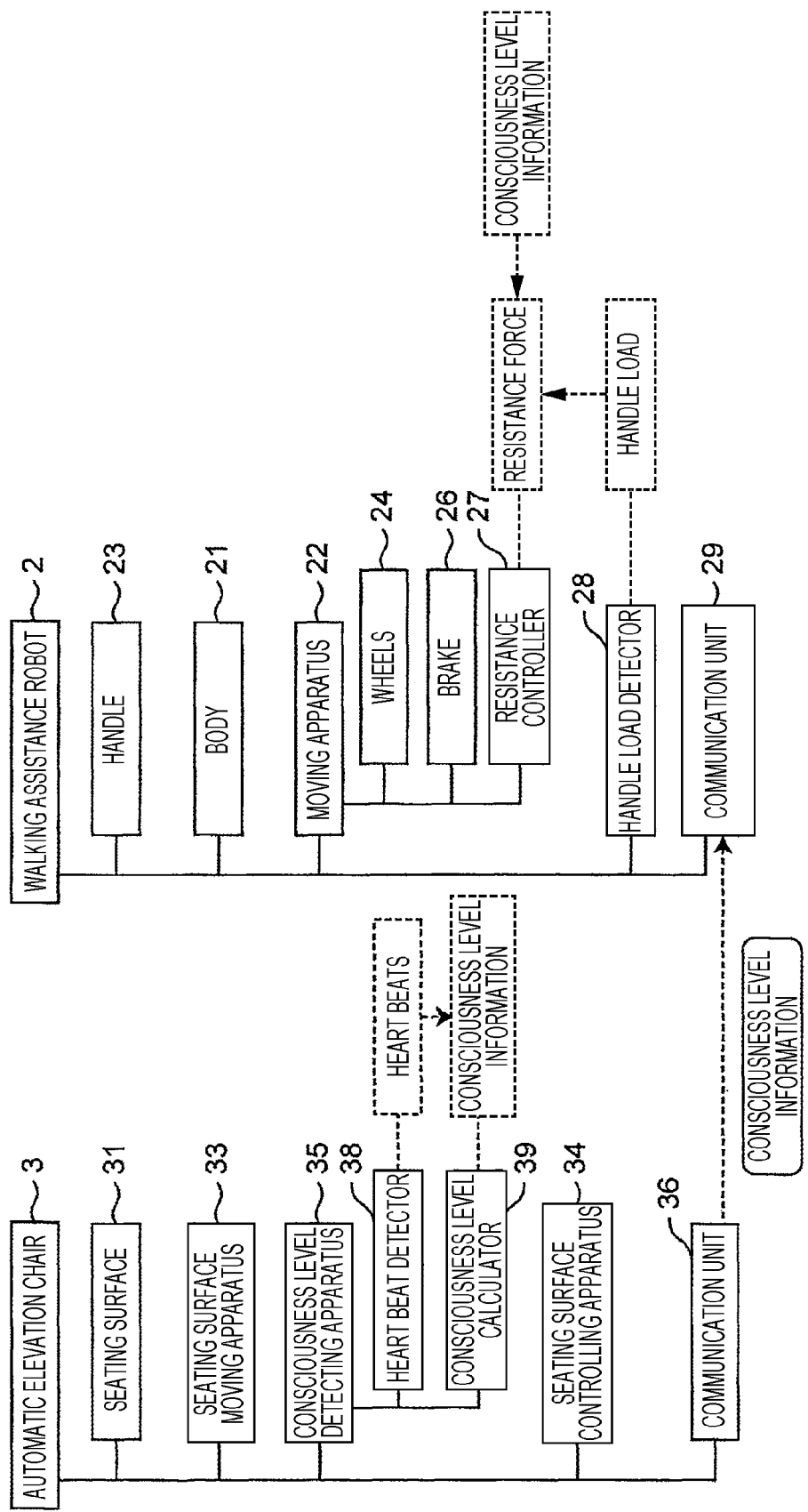
FIG. 4 is a control block diagram of the life assistance system according to the first embodiment of the present disclosure.

Descriptions will be provided for a control configuration to assist a stable start of the user's action after standing up, in the life assistance system 1 having the structure described above. FIG. 4 is a control block diagram illustrating a principal control configuration of the life assistance system 1. The control block diagram in FIG. 4 also illustrates the relationship between each constituent of the control configuration and information handled by the constituent.

As illustrated in FIG. 4, the consciousness level detecting apparatus 35 inputs data on the heart beats detected by the heart beat detector 38 to the consciousness level calculator 39, and calculates the consciousness level of the user at the consciousness level calculator 39. The consciousness level of the user calculated at the consciousness level calculator 39 is inputted to the communication unit 36 as the consciousness level information. The consciousness level information inputted to the communication unit 36 is transmitted, for example, to the communication unit 29 of the robot 2 via the communication network.

The consciousness level information transmitted to the communication unit 29 of the robot 2 is inputted to the resistance controller 27. The resistance controller 27 controls resistance force to the rotation of the wheels 24 based on the inputted consciousness level information. Specifically, the resistance controller 27 increases the resistance force to the rotation of the wheels 24 as the consciousness level of the user is lower. In other words, when the consciousness level of the user is low, the resistance controller 27 increases the resistance force to the rotation of the wheels 24 generated by the brake 26 to keep the robot 2 from moving. When the consciousness level of the user becomes high from the low state, the resistance controller 27 decreases the resistance force to the rotation of the wheels 24 generated by the brake 26 to allow the robot 2 to be moved smoothly. Note that as for the control of the resistance force, the value of the resistance force may be changed steplessly depending on the consciousness level of the user, or may be changed in stages taking predetermined resistance force values.

Meanwhile, the handle load detected by the handle load detector 28 included in the robot 2 is inputted to the resistance controller 27. The resistance controller 27 controls the resistance force to the rotation of the wheels 24 based on the inputted handle load. Specifically, when the handle load is stable, the resistance controller 27 stops applying the resistance force to the rotation of the wheels 24 generated by the brake 26.

(Operation of Life Assistance System)

Operation of the life assistance system 1 of the first embodiment will be described using FIG. 5 and FIGS. 6A to 6D.

Figure 5:
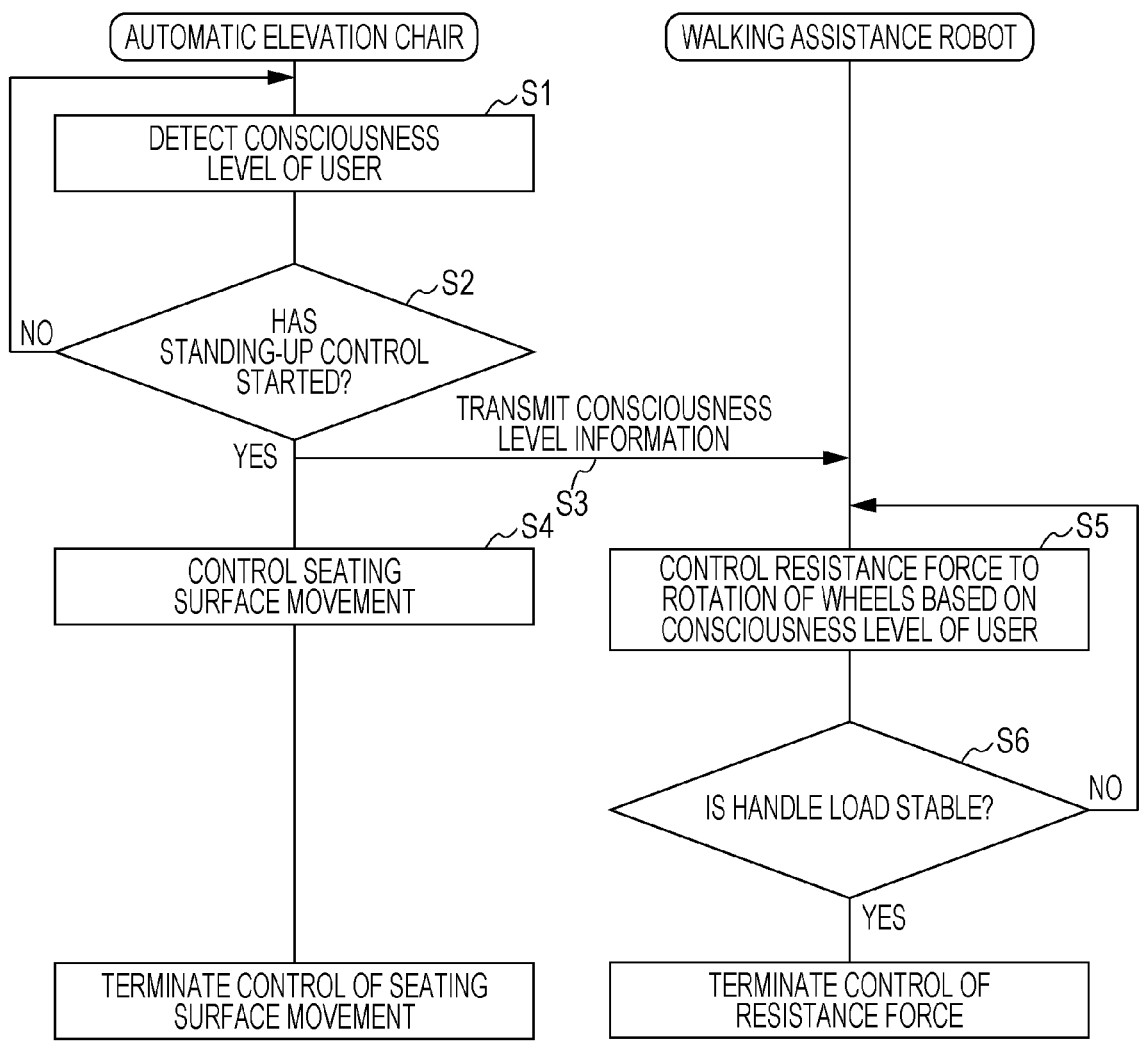
FIG. 5 is a flowchart illustrating operation of the life assistance system according to the first embodiment of the present disclosure.

FIG. 5 is a flowchart illustrating the operation of the life assistance system 1. The flowchart in FIG. 5 illustrates a procedure of the robot 2 and a procedure of the chair 3 in parallel, as well as an information exchange between the robot 2 and the chair 3. FIGS. 6A to 6D illustrate processes of assistance operation of the life assistance system 1.

Figure 6A:
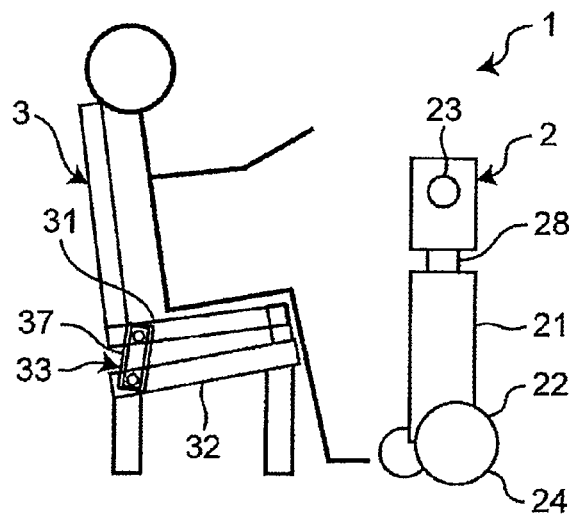
FIG. 6A illustrates a process of assistance operation of the life assistance system according to the first embodiment of the present disclosure.

As illustrated in FIG. 5, at step S1, the consciousness level detecting apparatus 35 detects the consciousness level of the user who is sitting (see FIG. 6A). Specifically, the heart beat detector 38 detects heart beats of the sitting user, and the consciousness level of the user is detected based on the detected heart beats. A method of detecting the consciousness level will be described later.

Next, at step S2, it is determined whether or not the standing-up assistance by the chair 3 has started. If the standing-up assistance by the chair 3 has started, the process proceeds to step S3 and step S4. On the other hand, if the standing-up assistance by the chair 3 has not started, the process returns to step S1.

Descriptions will be provided for an example of determining whether or not the standing-up assistance by the chair 3 has started. The chair 3 determines whether or not the relative position of the robot 2 to the chair 3 is located at an assistance position corresponding to a position set in advance. The relative position of the robot 2 to the chair 3 is calculated, for example, by a relative position calculator included in the robot 2.

In the case where it is determined that the relative position calculated by the relative position calculator of the robot 2 is located at the assistance position, the handle load is detected by the handle load detector 28. If the user sitting on the chair 3 is holding the handle 23, the handle load is detected by the handle load detector 28. When the handle load is detected by the handle load detector 28, the robot 2 transmits a signal to the chair 3 through the communication unit 29. The chair 3 receives the signal from the robot 2 through the communication unit 36 and starts the standing-up assistance.

In the first embodiment, when the chair 3 starts the standing-up assistance, the walking assistance robot 2 starts controlling the resistance force to the rotation of the wheels 24. In other words, when the chair 3 starts the standing-up assistance, the mode of the robot 2 is switched from the walking assistance mode to the resistance force control mode. In this specification, the "walking assistance mode" means a mode in which the robot 2 operates to assist the user in walking. The "resistance force control mode" means a mode in which the robot 2 controls the resistance force to the rotation of the wheels 24. In the resistance force control mode, the resistance force to the rotation of the wheels 24 is increased by the brake 26, and the robot 2 is put into the state where the movement of the robot 2 is regulated. The expression "the state where the movement of the robot 2 is regulated" is not the state where the movement of the robot 2 is completely locked, but the state where if the robot 2 is pushed by a force greater than the resistance force imposed by the brake 26, the robot 2 can be moved.

The resistance force control mode may be started, for example, by receiving information on the start of the standing-up assistance from the seating surface controlling apparatus 34 of the chair 3.

Figure 6B:
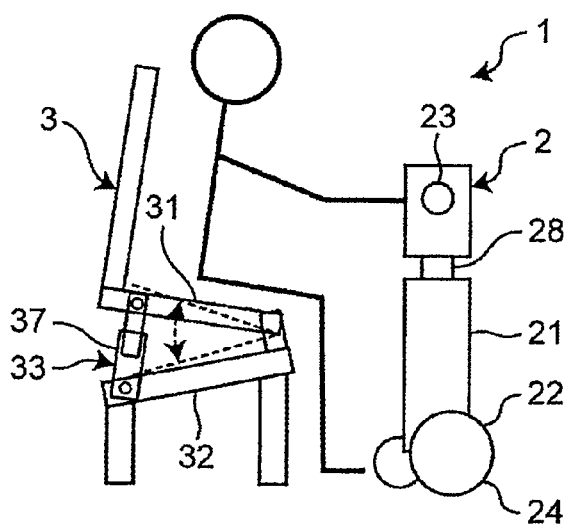
FIG. 6B illustrates a process of the assistance operation of the life assistance system according to the first embodiment of the present disclosure.
Figure 6C:
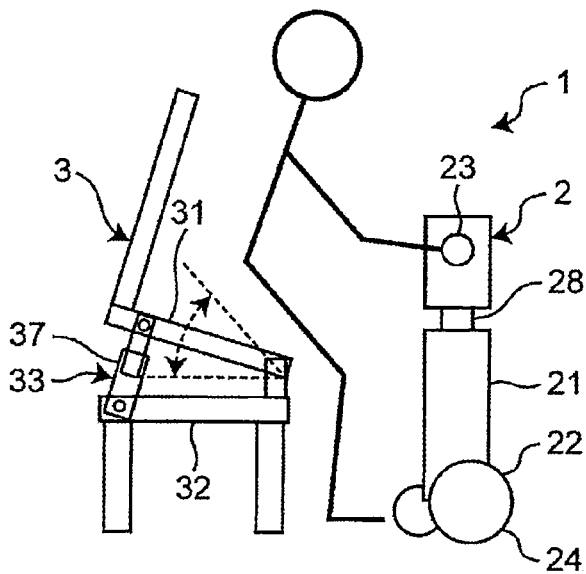
FIG. 6C illustrates a process of the assistance operation of the life assistance system according to the first embodiment of the present disclosure.

At step S3, the consciousness level information on the consciousness level of the user detected at step S1 is transmitted from the communication unit 36 of the chair 3 to the communication unit 29 of the robot 2 through the network (see FIG. 6B). The consciousness level information transmitted to the communication unit 29 is inputted to the resistance controller 27, and the process proceeds to step S5.

At step S4, the seating surface controlling apparatus 34 controls the movement of the seating surface 31 caused by the seating surface moving apparatus 33 (in other words, the elevation actuator 37) based on the assistance control information such as seating surface load information on the user. Specifically, under the control of the seating surface controlling apparatus 34, the seating surface 31 pivots clockwise on the rotation axis by the expansion of the elevation actuator 37 depending on the state of the user (see FIG. 6C).

At step S5, the resistance controller 27 controls the resistance force to the rotation of the wheels 24 of the robot 2 based on the consciousness level information on the user. Specifically, when the consciousness level of the user is low, the resistance controller 27 increases the resistance force to the rotation of the wheels 24 by controlling the brake 26. On the other hand, when the consciousness level of the user is high, the resistance controller 27 decreases the resistance force to the rotation of the wheels 24 by controlling the brake 26.

Figure 6D:
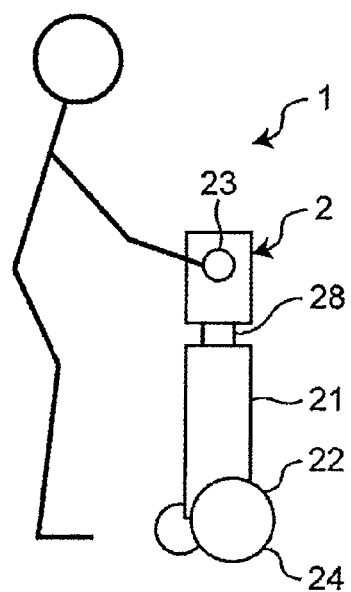
FIG. 6D illustrates a process of the assistance operation of the life assistance system according to the first embodiment of the present disclosure.

At step S6, the resistance controller 27 determines whether or not the handle load detected by the handle load detector 28 is stable (see FIG. 6D). If the handle load is stable, the resistance controller 27 terminates the control of the resistance force. When the control of the resistance force (resistance force control mode) by the resistance controller 27 is terminated, the mode of the robot 2 is switched to the mode for assisting the user in walking (walking assistance mode). On the other hand, when the handle load is unstable, the process returns to step S5, and the control of the resistance force continues.

(Method of Detecting Consciousness Level)

Figure 7A:
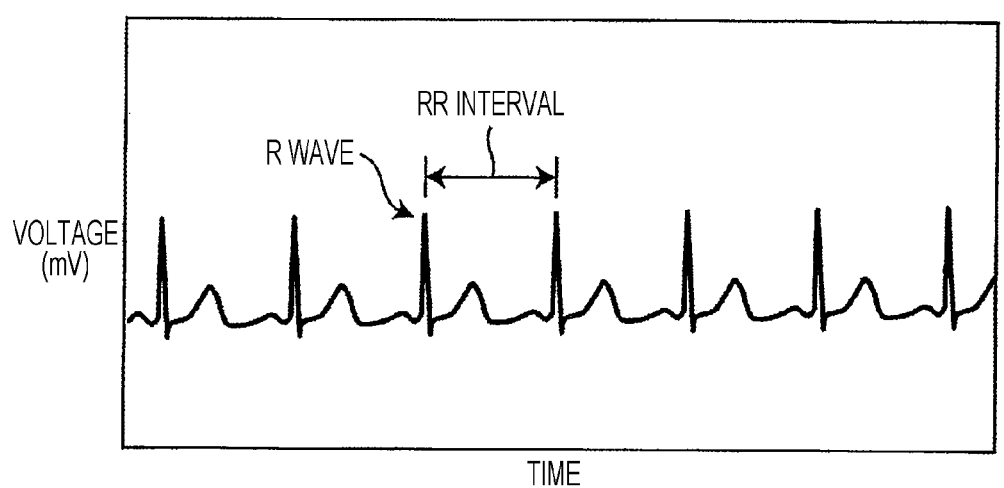
FIG. 7A is a diagram illustrating an example of a detection method for a consciousness level of a user.
Figure 7B:
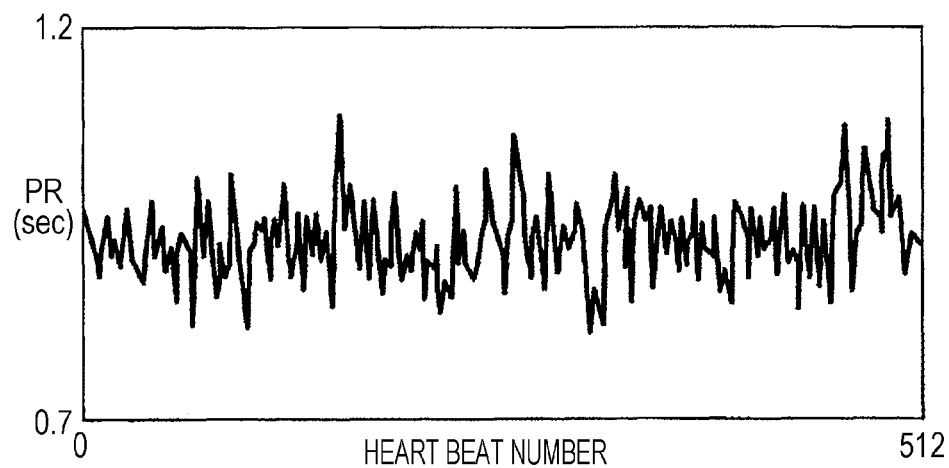
FIG. 7B is a diagram illustrating the example of the detection method for a consciousness level of a user.
Figure 7C:
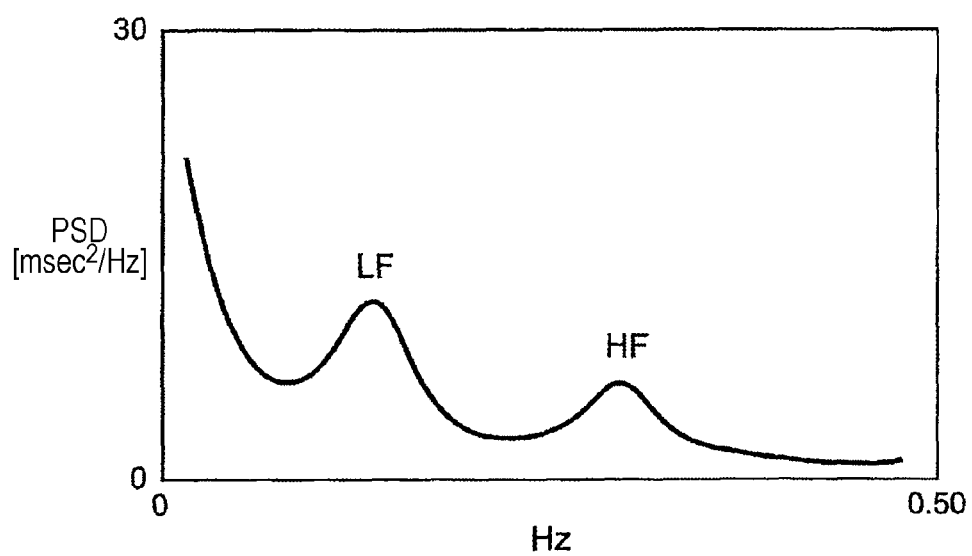
FIG. 7C is a diagram illustrating the example of the detection method for a consciousness level of a user.

Next, descriptions will be provided for an example of a method of detecting a consciousness level of the user by the consciousness level detecting apparatus 35, using FIGS. 7A to 7C.

In the first embodiment, the heart beat detector 38 of the consciousness level detecting apparatus 35 detects the consciousness level of the user. Based on the heart beats detected by the heart beat detector 38, the consciousness level calculator 39 calculates the consciousness level of the user. Hereinafter, descriptions are provided for an example of the calculation of the consciousness level performed by the consciousness level calculator 39.

FIG. 7A illustrates user's heart beats (electrocardiogram) detected by the heart beat detector 38. In FIG. 7A, the vertical axis represents voltage (mV), and the horizontal axis represents time. As illustrated in FIG. 7A, the electrocardiogram includes multiple "R waves", which are sharpest peaks. The consciousness level calculator 39 calculates intervals of these "R waves", in other words, RR intervals. Each of the RR intervals slightly varies.

FIG. 7B illustrates the variations of the calculated RR intervals graphically. In FIG. 7B, the vertical axis represents the RR interval (sec), and the horizontal axis represents heart beat numbers. FIG. 7B shows the variability of heart beats caused by the variation of the RR intervals.

FIG. 7C illustrates a spectral analysis result filtering the frequencies of the variability of the heart beats. In FIG. 7C, the vertical axis represents the power spectral density ($msec^2/Hz$), and the horizontal axis represents the frequency (Hz). As illustrated in FIG. 7C, an LF component having a peak at around 0.1 Hz and an HF component having a peak at around 0.25 Hz appear. Here, the "LF component" reflects activities of sympathetic nerves and parasympathetic nerves. The "HF component" reflects activities of parasympathetic nerves. The sympathetic nerves are active in the cases of "being active", "being nervous", and the like. The parasympathetic nerves are active in the cases of "taking a rest", "being relaxed", and the like.

Next, an LF component/HF component is calculated as an index of the sympathetic nerve function. The consciousness level calculator 39 judges that the lower the LF component/HF component is, the lower the consciousness level of the user is, and that the higher the LF component/HF component is, the higher the consciousness level of the user is.

(Termination of Resistance Force Control Mode)

Figure 8:
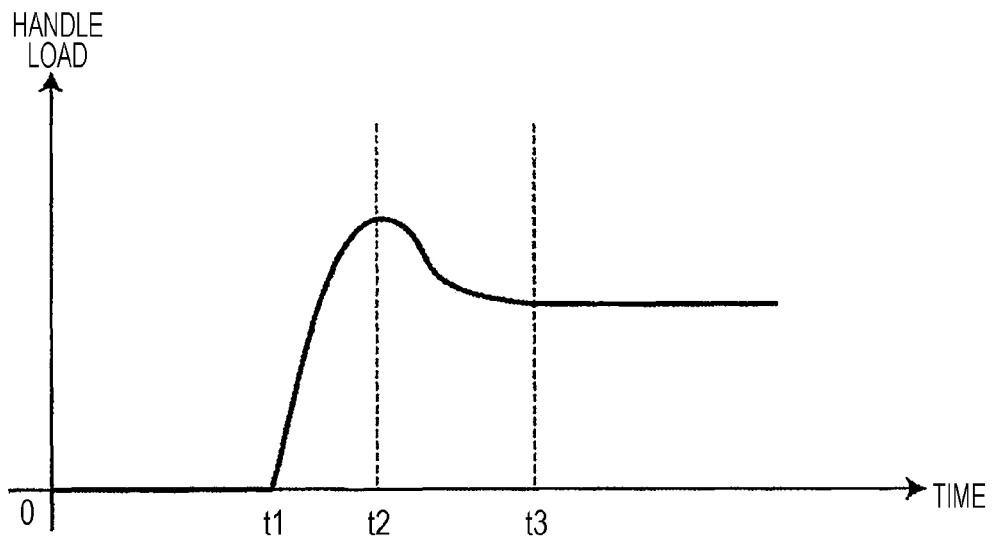
FIG. 8 is a diagram illustrating a change of a handle load from the time a user is sitting on a chair according to the first embodiment of the present disclosure until the user stands up and starts walking stably.

Using FIG. 8, descriptions will be provided for a method of the robot 2 terminating the resistance force control mode and being switched to the walking assistance mode.

FIG. 8 illustrates a change of the handle load from the time the user is sitting on the chair 3 until the user stands up and starts walking stably. The handle load illustrated in FIG. 8 means a force pushing the robot 2 in the moving direction (the forward direction illustrated in FIG. 1).

As illustrated in FIG. 8, when the user sitting on the chair 3 starts standing up, the user put his/her hand on the handle 23 of the robot 2 (at time t1 in FIG. 8). By the user putting his/her hand on the handle 23, the handle load imposed on the handle 23 increases. At the moment when the user is standing up away from the seating surface of the chair 3, the user leans most against the handle 23, and the handle load imposed on the handle 23 shows its peak (at time t2 in FIG. 8). After the user has stood up, the handle load decreases. After that, the user in the standing state starts walking. When the user is walking stably, the handle load imposed on the handle 23 shows a value smaller than the handle load at time t2 and becomes in a stable state (at time t3 in FIG. 8). The stable state means a state where the handle load shows almost no change and is substantially constant. For example, a state where the fluctuation of the handle load is within a predetermined range is regarded as the stable state.

In the first embodiment, after the standing-up assistance by the chair 3 starts, in the case where the handle load detected by the handle load detector 28 is stable (for example, at time t3 and afterward in FIG. 8), the resistance force control mode is terminated and switched to the walking assistance mode.

ADVANTAGEOUS EFFECTS

According to the life assistance system 1 of the first embodiment, the following advantageous effects can be obtained.

According to the life assistance system 1 of the first embodiment, it is possible to control the resistance force to the rotation of the wheels 24 of the robot 2 based on the consciousness level of the user. Since the configuration above makes it is possible to regulate the movement of the robot 2 depending on the consciousness level of the user, the user can start walking smoothly after standing up with the standing-up assistance by the chair 3.

When the consciousness level of the user is low, the life assistance system 1 increases the resistance force to the rotation of the wheels 24 of the robot 2. The configuration above reduces the risk of the user with a low consciousness level falling down or other accidents after standing up with the standing-up assistance by the chair 3, and allows the user to start walking stably.

The state where the resistance force to the rotation of the wheels 24 is controlled by the resistance controller 27 (the resistance force control mode) is not the state where the wheels 24 of the robot 2 are completely locked, but the state where if the user's pushing force is stronger than the resistance force, the wheels 24 can rotate. Accordingly, when the user's pushing force is stronger (when the consciousness level of the user is high), the user can move the robot 2 and start walking smoothly after standing up.

According to the life assistance system 1, it is possible to detect the consciousness level of the user easily based on the user's heart beats.

In addition, when the handle load detected by the handle load detector 28 is stable, the resistance controller 27 terminates the resistance force control mode. As described above, when the handle load becomes stable, the resistance controller 27 determines that the consciousness level of the user has become high from a low state and can judge a termination of the resistance force control mode easily.

Note that as a method of detecting the consciousness level in the first embodiment, descriptions have been provided for an example of calculating the consciousness level by calculating the LF component/HF component based on the user's heart beats. However, the method is not limited thereto. For example, as a method of detecting the consciousness level based on heart beats, an estimation method for the consciousness level may be used which is based on a chaos analysis of the heart beats.

Figure 9:
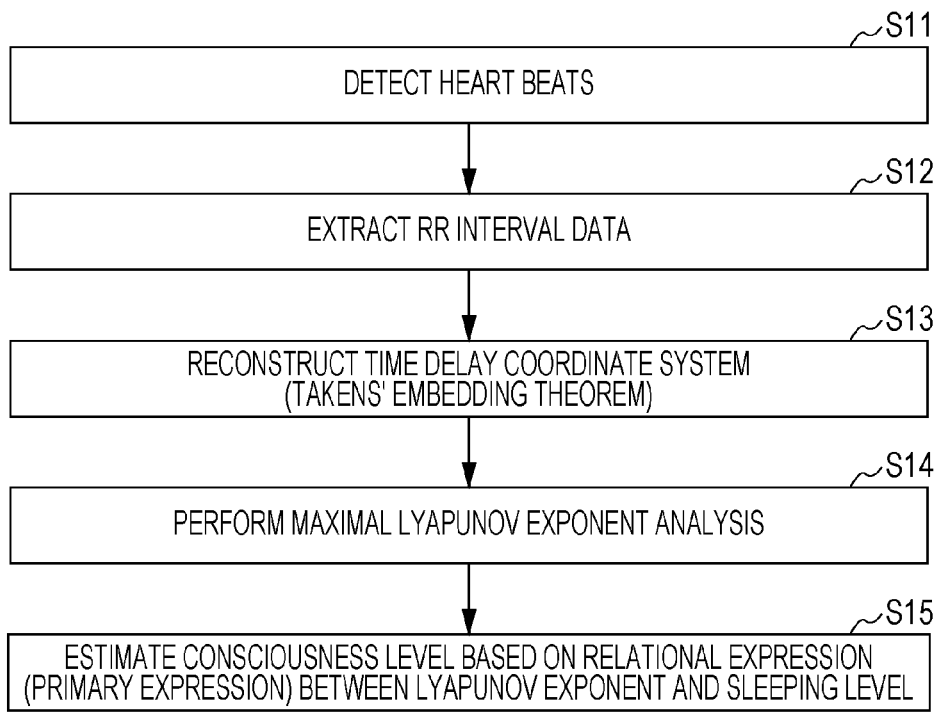
FIG. 9 is a flowchart for an estimation method for a consciousness level based on a chaos analysis of heart beat variability.

FIG. 9 illustrate a flowchart for the estimation method for the consciousness level based on the chaos analysis of the heart beat variability.

As illustrated in FIG. 9, the heart beat detector 38 detects the user's heart beats at step S11. At step S12, the consciousness level calculator 39 extracts the RR interval data. At step S13, the time delay coordinate system is reconstructed based on Takens' embedding theorem. Here, the reconstruction of the time delay coordinate system may be expressed by the following formulae, in which x[n] (n is the number of data points) represents time-series data of the RR intervals and d represents the embedding dimension:

First point:$(x[1],x[2], \ldots ,x[d])$

Second point:$(x[2],x[3], \ldots ,x[d+1])$

Third point:$(x[3],x[4], \ldots ,x[d+2])$

. . .

n–d th point:$(x[n-d],x[n-d+1], \ldots ,x[n])$  [Math. 1]

As above, the reconstruction of the time delay coordinate system means regarding d of consecutive RR interval data as a vector and re-expressing each of the vectors as a point in a d-dimension space. At step S14, a maximal Lyapunov exponent analysis is performed on the reconstructed dimension vectors of the reconstructed time delay coordinate system. Here, it is known that when a maximal Lyapunov exponent takes a positive value, the data have chaotic properties. At step S15, the consciousness level is estimated based on a relational expression (primary expression) between the Lyapunov exponent obtained by the maximal Lyapunov exponent analysis and the sleeping level.

Note that in the first embodiment, descriptions have been provided for an example where the robot 2 starts the resistance force control mode when the chair 3 starts the standing-up control. However, the disclosure is not limited to this example. Any method may be employed as long as the robot 2 starts the resistance force control mode before the user holds the handle 23 after starting standing up.

In the first embodiment, the handle load detector 28 may detect a handle load in the perpendicular direction to the bottom surface. With this configuration, the resistance force control mode may be terminated when the handle load in the direction perpendicular to the bottom surface becomes stable. The handle load detector 28 may detect a handle load imposed by each of user's right and left hands. With this configuration, the resistance force control mode may be terminated based on a balance between right and left handle loads imposed on the handle 23 held by the user's right and left hands. For example, the robot 2 may terminate the resistance force control mode when the handle load detector 28 detects that the handle load imposed by the user's right hand is almost equal to the handle load imposed by the user's left hand.

In the first embodiment, descriptions have been provided for an example where the autonomous mobile robot that moves by the user's pushing force is employed as the robot 2. However, the disclosure is not limited to this example. For example, the robot 2 may be an autonomous mobile robot that moves pulling the user in the target direction.

In the first embodiment, descriptions have been provided for an example where the resistance force to the rotation of the wheels 24 is controlled by the resistance controller 27 included in the robot 2. However, the disclosure is not limited to this example. For example, the resistance controller 27 may be included in the chair 3, and the control of the resistance force may be performed from the chair 3 side.

In the first embodiment, descriptions have been provided for an example where the seating surface controlling apparatus 34 controls and causes the seating surface moving apparatus 33 to move the seating surface 31 based on the seating surface load information as the assistance control information. However, the disclosure is not limited to this example. For example, the seating surface controlling apparatus 34 may include user's posture information and the like as the assistance control information to control the seating surface moving apparatus 33.

In the first embodiment, the communication network includes either a wired network or a wireless network, or both of them.

In the first embodiment, descriptions have been provided for an example where the consciousness level calculator 39 and the resistance controller 27 are included in the chair 3 and the robot 2, respectively. The disclosure in not limited to this example. For example, the consciousness level calculator 39 and the resistance controller 27 may be included in a server apparatus connected to both the chair 3 and the robot 2 via a communication network.

In the first embodiment, descriptions are provided for a configuration in which the consciousness level information calculated by the consciousness level calculator 39 of the chair 3 is transmitted to the robot 2 through the communication unit 36. However, the disclosure is not limited to this configuration. For example, the consciousness level information calculated by the consciousness level calculator 39 of the chair 3 may be stored once in an un-illustrated register. When receiving a request for the consciousness level information from the robot 2, the consciousness level information may be read out from the register and obtained through the communication unit 36 of the chair 3. In other words, the configuration may be one that enables the communication unit 36 to acquire and transmit the consciousness level information when receiving a request for the consciousness level information from the robot 2.

Second Embodiment

[Overall Structure]

A life assistance system according to a second embodiment of the present disclosure will be described using FIGS. 10 and 11.

Figure 10:
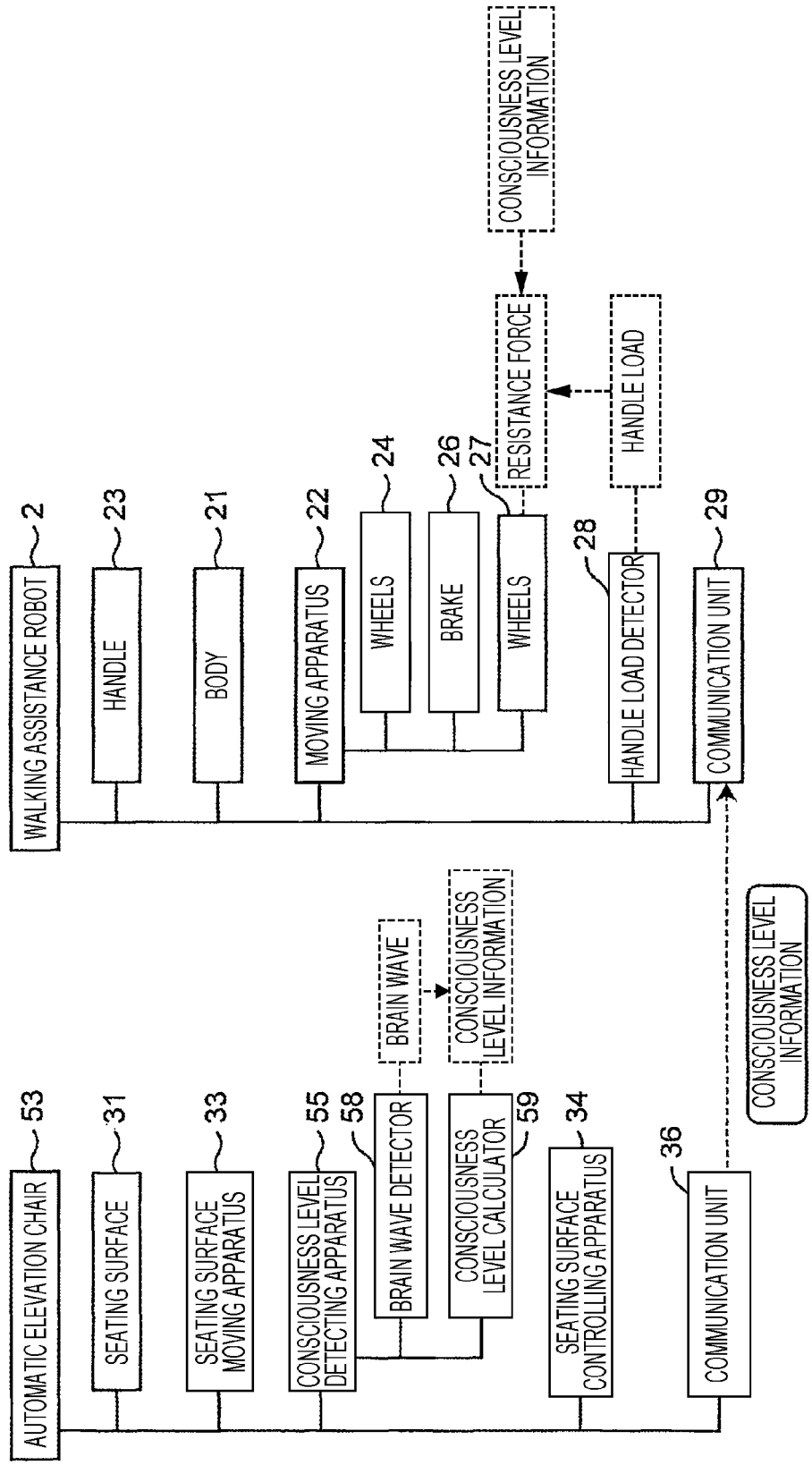
FIG. 10 is a control block diagram of a life assistance system according to a second embodiment of the present disclosure.
Figure 11:
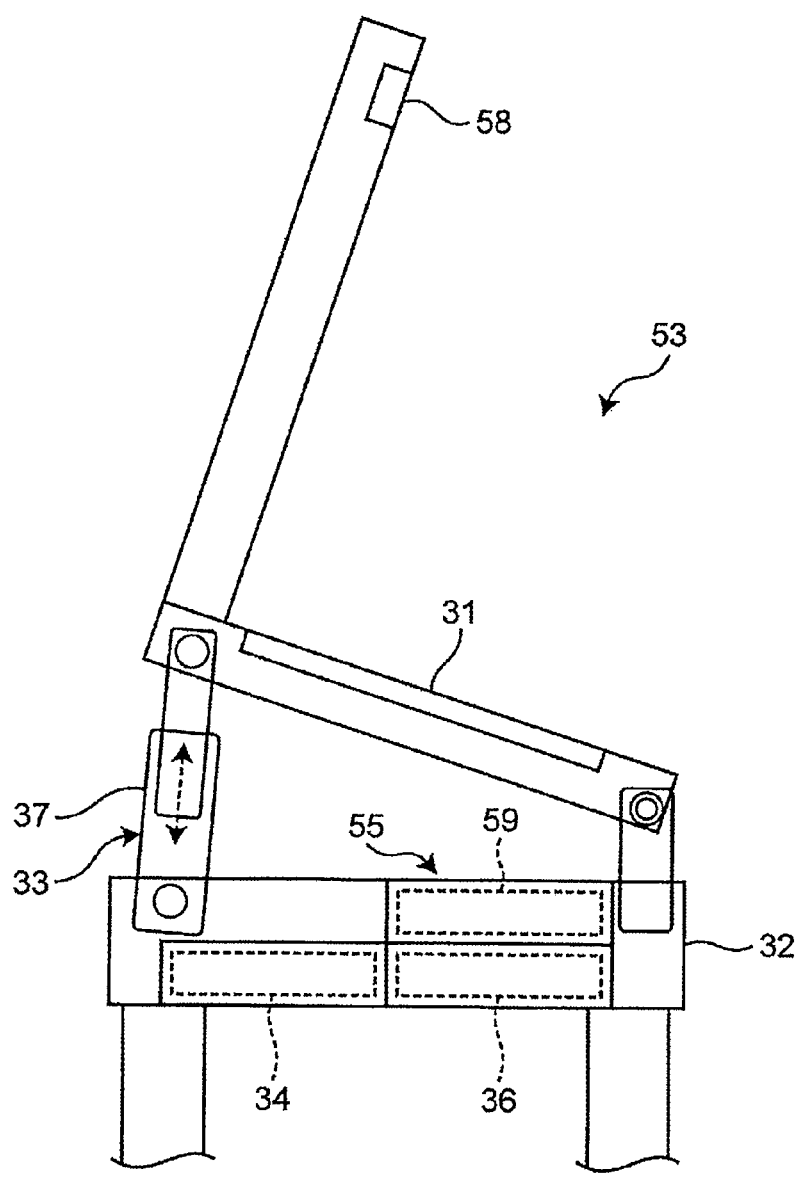
FIG. 11 is an external view of a chair according to the second embodiment of the present disclosure.

FIG. 10 is a control block diagram of a life assistance system 51 according to the second embodiment. FIG. 11 is an external view of a chair 53 according to the second embodiment. Note that in the second embodiment, descriptions will mainly be provided for points different from the first embodiment. In the second embodiment, the constituents the same as or substantially the same as those of the first embodiment are denoted by the same reference signs to be described. In addition, in the second embodiment 2, the same descriptions as in the first embodiment are omitted.

As illustrated in FIG. 10, the life assistance system 51 includes the robot 2 corresponding to the autonomous mobile robot and the chair 53 corresponding to the automatic elevation chair.

The second embodiment is different from the first embodiment in that the user's brain waves are detected and the consciousness level of the user is detected based on the detected brain waves. As illustrated in FIGS. 10 and 11, the second embodiment is different from the first embodiment in that a brain wave detector 58 and a consciousness level calculator 59 constitute a consciousness level detecting apparatus 55.

The brain wave detector 58 is for detecting the user's brain waves. In the second embodiment, the brain wave detector 58 is, for example, a brain wave sensor capable of detecting alpha waves and theta waves. As illustrated in FIG. 11, the brain wave detector 58 is provided to a backrest of the chair 53, for example, at a position where the user's head comes in contact. In addition, multiple brain wave detectors 58 may be provided to the backrest of the chair 53.

The consciousness level calculator 59 calculates the consciousness level of the user based on the brain waves detected by the brain wave detector 58.

(Method of Detecting Consciousness Level)

A method of detecting consciousness level according to the second embodiment will be described.

First, the brain wave sensor is brought in contact with the user's head. It is known that in this case, a portion around the back of the user's head (o1, o2, oz, or the like in the 10/20 system) is preferable and easy to detect signals from. This comes from reasons such as that noises generated by eyeball movement is unlikely to get into the signals.

Next, the user's signal waves are detected. The consciousness level detecting apparatus 55 determines whether or not characteristic waves of the brain waves, such as alpha waves, are included. The consciousness level detecting apparatus 55 judges that if beta waves are dominant, the consciousness level is high and that if alpha waves or theta waves are dominant, the consciousness level is low. Note that it is known that the alpha waves tend to appear at the beginning of sleep, and theta waves tend to appear in a deep sleep.

Here, as for the method of distinguishing the consciousness levels using the above configuration, which wave form is dominant may be detected by transferring waveforms of the brain waves into a frequency domain (Fourier transformation) and checking which frequency is dominant. The consciousness level is judged based on the detection result.

ADVANTAGEOUS EFFECTS

According to the life assistance system 51 of the second embodiment, the following advantageous effects can be obtained.

According to the life assistance system 51 of the second embodiment, since the consciousness level of the user can be detected based on the user's brain waves, the consciousness level of the user can be detected more accurately. Accordingly, the user can start walking more smoothly after standing up with the standing-up assistance by the chair 3.

The use of brain waves makes the detection of the consciousness level resistant to a position gap between the head and the sensor.

Although the present disclosure has been described in details at a certain extent in each embodiment, the contents of the disclosure in the embodiments may be modified in the details of the configurations as a matter of course. In addition, the combinations and the orders of the constituents in each embodiment can be modified without departing the scope and the spirit of the present disclosure.

Note that the methods of detecting the consciousness level described in the first and second embodiments are mere examples, and the present disclosure is not limited to these methods. Known various methods may be employed as a method of detecting the consciousness level.

The present disclosure is applicable to a life assistance system and a life assistance method for assisting a user's smooth action after standing up from a chair.

For example, the life assistance system including the walking assistance robot and the automatic elevation chair according to the present disclosure is capable of assisting the user's smooth action after standing up with the standing-up assistance by the chair. Accordingly, it is useful to apply the life assistance system to the users who need to stand up with the assistance for the standing-up action and start walking stably.

What is claimed is:

1. A walking assistance robot comprising:
    a body;
    a rotor that moves the walking assistance robot;
    a handle that is provided to the body and that a user is able to hold;
    a sensor that detects a handle load imposed on the handle;
    a processor, and
    a memory storing a computer program, which when executed by the processor, causes the processor to perform operations including:
        receiving consciousness level information on a consciousness level of the user via a network;
        performing resistance force control, in which resistance force applied to rotation of the rotor is controlled based on the received consciousness level information; and
        terminating the resistance force control so that the resistance force is not applied to the rotor, based on the handle load detected by the sensor.

2. The walking assistance robot according to claim 1, wherein
    in the resistance force control, the resistance force is increased as the consciousness level of the user is lower.

3. The walking assistance robot according to claim 1, further comprising a brake that applies the resistance force to the rotor,
- wherein, in the resistance force control, the resistance force is controlled by changing the resistance force applied to the rotor by the brake based on the received consciousness level information, and
- the resistance force control is terminated by releasing the brake so that the brake does not apply the resistance force to the rotor.

4. The walking assistance robot according to claim 1,
- wherein the processor further performs operations including:
  - determining whether or not the handle load detected by the sensor is stable,
- wherein the resistance force control is terminated in response to determining that the handle load is stable.

5. The walking assistance robot according to claim 4, wherein the handle load is determined as stable, when a fluctuation of the handle load is within a predetermined range.

6. The walking assistance robot according to claim 3, wherein,
- in the resistance force control, the brake applies the resistance force to the rotor to regulate the rotation of the rotor so that the walking assistance robot is movable when the walking assistance robot is pushed by a force greater than the resistance force, and is not locked to stop the walking assistance robot.

7. The walking assistance robot according to claim 1, wherein the consciousness level of the user is determined based on a heart beat of the user detected by a heartbeat sensor.

* * * * *